(12) United States Patent
Borgerson et al.

(10) Patent No.: US 7,220,206 B2
(45) Date of Patent: May 22, 2007

(54) HYDROSTATICALLY APPLIED CLUTCH SYSTEM WITH MULTIPLEX MASTER CYLINDERS

(75) Inventors: James B. Borgerson, Ann Arbor, MI (US); Clinton E. Carey, Monroe, MI (US); Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 186 days.

(21) Appl. No.: 11/002,371

(22) Filed: Dec. 2, 2004

(65) Prior Publication Data

US 2006/0122021 A1 Jun. 8, 2006

(51) Int. Cl.
*F16H 31/00* (2006.01)
(52) U.S. Cl. .................. 475/116; 192/87.13; 192/87.18
(58) Field of Classification Search ................ 475/123, 475/275, 149, 116; 192/87.13, 87.18
See application file for complete search history.

(56) References Cited

U.S. PATENT DOCUMENTS 6,960,146 B2 * 11/2005 Haka .......................... 475/116
2006/0042906 A1 * 3/2006 Ronk et al. ............... 192/85 C

* cited by examiner

*Primary Examiner*—Roger Pang
*Assistant Examiner*—Edwin A. Young
(74) *Attorney, Agent, or Firm*—Dan L. Thompson

(57) ABSTRACT

A power transmission incorporates a plurality of torque-transmitting mechanisms having stationary piston torque-transmitting mechanisms. Each of the torque-transmitting mechanisms is controlled by one or more hydraulic master cylinders, which provide hydrostatic apply pressure for the respective torque-transmitting mechanisms. The control apparatus may incorporate either two or three master cylinders for controlling five torque-transmitting mechanisms through a plurality of selectively operable valve mechanisms.

2 Claims, 2 Drawing Sheets

HYDROSTATICALLY APPLIED CLUTCH SYSTEM WITH MULTIPLEX MASTER CYLINDERS

TECHNICAL FIELD

This invention relates to control mechanisms for power transmissions and, more particularly, to electro-hydraulic control apparatuses for torque-transmitting mechanisms within a powertrain.

BACKGROUND OF THE INVENTION

Powertrains for automotive use generally have a plurality of forward gear ratios and at least one reverse gear ratio. Many of these powertrains employ planetary gear mechanisms, which are controlled in ratio by selectively engageable torque-transmitting mechanisms such as clutches and brakes. These clutches and brakes are generally hydraulically applied mechanisms and therefore require a control system that will both engage the torque-transmitting mechanisms and disengage the torque-transmitting mechanisms. The mechanism for controlling the application and exhausting of the torque-transmitting mechanisms has generally taken the form of electro-hydraulic mechanisms and usually includes a positive displacement hydraulic pump and a plurality of solenoid mechanisms and valve mechanisms for the distribution of fluid from the hydraulic pump.

The use of a continuously operating pump while providing the necessary and required hydraulic pressure does also consume a considerable amount of energy. The pump must run continuously and supply pressure continuously whenever the powertrain is placed within at least one of the gear ratios.

SUMMARY OF THE INVENTION

It is an object of the present invention to provide an improved electro-hydraulic control apparatus for a multi-ratio power transmission.

In one aspect of the present invention, the hydraulic control apparatus includes a plurality of hydrostatic pumps.

In another aspect of the present invention, the hydrostatic pumps are operated to provide controlled engagement and disengagement of a plurality of torque transmitting mechanisms numbering more than the number of hydrostatic pumps.

In yet another aspect of the present invention, three hydraulic master cylinders comprising an electric motor and pump are employed to supply fluid pressure for controlling five torque-transmitting mechanisms, which when controlled in combinations of two will establish six forward speed ratios and one reverse speed ratio in a power transmission.

In still another aspect of the present invention, each of the torque-transmitting mechanisms is disposed in a circuit having a control valve, which maintains fluid pressure within the torque-transmitting mechanism as desired.

In yet still another aspect of the present invention, the control apparatus employs two electric motor-driven master cylinders operated in multiplexing arrangements with valve mechanisms to supply five torque-transmitting mechanisms in a controlled manner.

DESCRIPTION OF THE EXEMPLARY EMBODIMENTS

Figure 1:
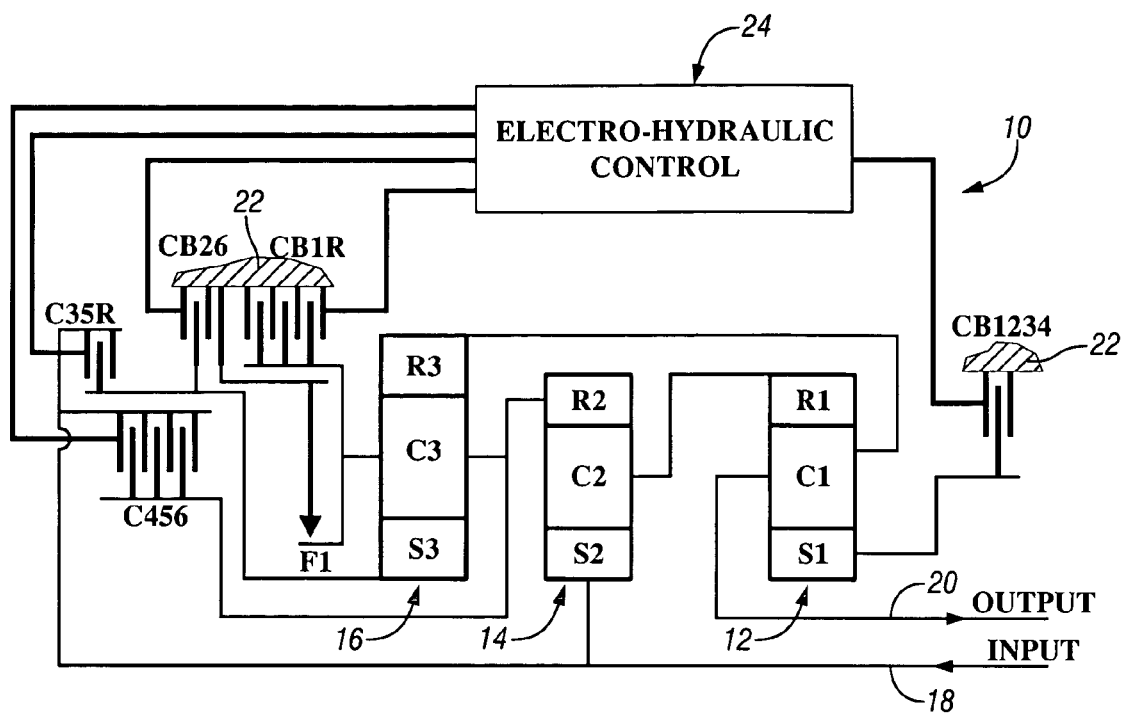
FIG. 1 is a schematic and diagrammatic representation of a multi-speed power transmission having an electro-hydraulic control mechanism incorporating the present invention.

Referring to the drawings, wherein like characters represent the same or corresponding parts throughout the several views, there is seen in FIG. 1 a power transmission 10 having three planetary gearsets 12, 14, and 16, five torque-transmitting mechanisms CB1R, CB26, C35R, C456, and CB1234. The transmission 10 also includes an input shaft 18 and an output shaft 20.

The planetary gearset 12 includes a sun gear member S1, a planet carrier assembly C1, and a ring gear member R1. The planetary gearset 14 includes a sun gear member S2, a planet carrier assembly C2, and a ring gear member R2. The planetary gearset 16 includes a sun gear member S3, a planet carrier assembly member C3, and a ring gear member R3.

The planet carrier assembly C1 is continuously connected with the ring gear member R3, the ring gear member R1 is continuously connected with the planet carrier assembly C2, and the ring gear member R2 is continuously connected with the planet carrier assembly member C3. The planet carrier assembly C1 and therefore ring gear member R3 are continuously connected with the transmission output shaft 20.

The sun gear member S2 is continuously connected with the input shaft 18. The input shaft 18 is selectively connectible with the ring gear member R2 and planet carrier assembly member C3 through the torque-transmitting mechanism C456. The input shaft 18 is selectively connectible with the sun gear member S3 through the selectively engageable torque-transmitting mechanism C35R. The sun gear member S3 is also connectible with the torque-transmitting mechanism CB26, which is in turn connected with a transmission housing or stationary member 22.

The ring gear member R2 and planet carrier assembly member C3 are operatively connectible with the housing 22 through the torque-transmitting mechanism CB1R. The sun gear member S1 is selectively connectible with the transmission housing member 22 through the torque-transmitting mechanism CB1234. The torque-transmitting mechanisms having a "CB" designation are stationary type torque-transmitting mechanisms. The torque-transmitting mechanisms designated "C" are rotating type torque-transmitting mechanisms, which provide for rotary input to the planetary gear members with which they are associated. These, of course, are well-known devices to those skilled in the art.

The torque-transmitting mechanisms are hydraulically operated and are selectively engageable and disengageable by an electro-hydraulic control 24, which may include a plurality of hydraulic pumps and an electronic control module, which incorporates a programmable digital computer. Electric engagement and disengagement of the torque-transmitting mechanisms is provided by the electro-hydraulic control 24 in combinations of two to establish six forward speed ratios and one reverse speed ratio.

The first forward speed ratio is established with the engagement of the torque-transmitting mechanisms CB1R or F1 and CB1234. The second forward speed ratio is established with the engagement of torque-transmitting mechanisms CB1234 and CB26. The third forward speed ratio is established with the selected engagement of the torque-transmitting mechanisms CB1234 and C35R. The fourth forward speed ratio is established with the engagement of the torque-transmitting mechanisms CB1234 and C456. The fifth forward speed ratio is established with the engagement of the torque-transmitting mechanisms C456 and C35R. The sixth forward speed ratio is established with the engagement of the torque-transmitting mechanisms C456 and CB26. The reverse speed ratio is established with the engagement of the torque-transmitting mechanisms CB1R and C35R. The torque-transmitting mechanisms, as previously mentioned, are hydraulically controlled. The rotating type torque-transmitting mechanisms C35R and C456 have associated therewith a stationary piston 42 such as that shown in FIG. 2.

Figure 2:
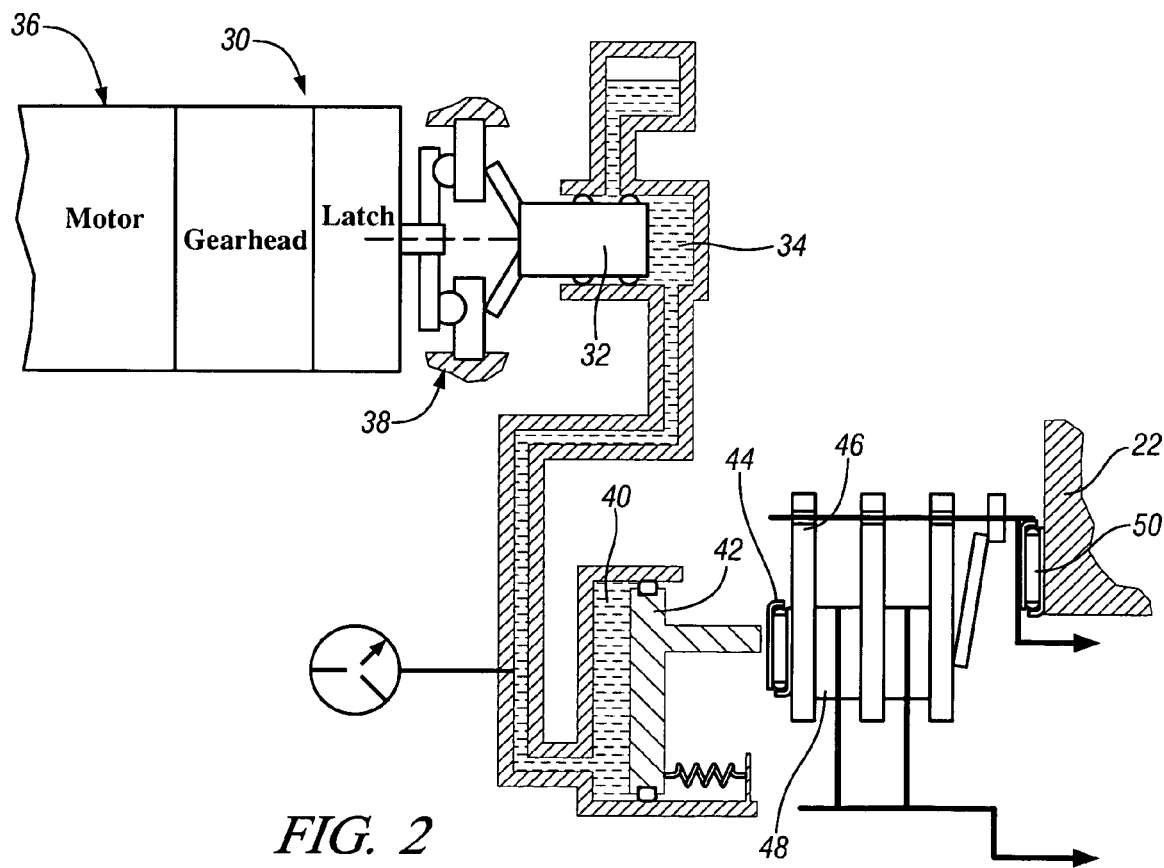
FIG. 2 is a diagrammatic representation of a hydrostatically applied rotating clutch.

In FIG. 2 there is seen a motor and master cylinder 30, which includes a pump piston 32 and a cylinder 34. The pump piston 32 is moved into and out of the cylinder 34 by an electric motor 36 and a conventional torque-to-thrust apparatus 38. The fluid pressure in the cylinder 34 is distributed to a cylinder 40 in which is disposed a piston 42. The cylinder 40 and piston 42 are stationary with the transmission housing 22. The piston 42 is aligned to operate through a bearing 44 to provide frictional engagement of a plurality of friction discs 46 and 48. The engaging force for the torque-transmitting mechanism is taken through a bearing 50 and the transmission housing 22. Those skilled in the art will be familiar with the operation of such a device. By controlling the rotation and direction of the motor 36, the condition of the torque-transmitting mechanisms can be controlled both in engagement and disengagement.

Figure 3:
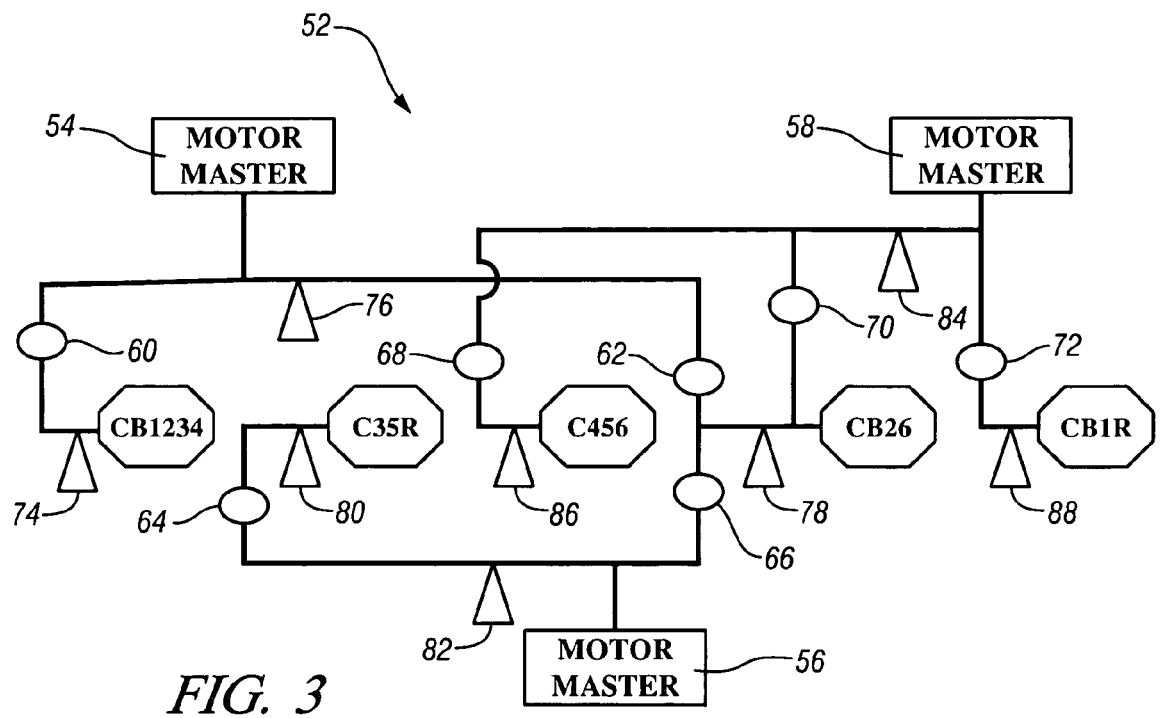
FIG. 3 is a diagrammatic representation of a control system and torque-transmitting mechanism for a power transmission incorporating the present invention.

Referring to FIG. 3 of the drawings, there is seen a diagrammatic view of a control apparatus or mechanism 52, which includes three motor and master cylinder assemblies 54, 56, and 58. Also incorporated within the control apparatus 52 are a plurality of control valves 60, 62, 64, 66, 68, 70, and 72 and a plurality of pressure sensors 74, 76, 78, 80, 82, 84, 86, and 88.

The valves 60, 62, 64, 66, 68, 70 and 72 may be constructed in accordance with the valve mechanism and pump motor driven hydraulic cylinder shown in U.S. Ser. No. 10/975,890 filed Oct. 28, 2004. The valves 60 and 62 are associated with the motor and master cylinder 54 as well as with the torque-transmitting mechanisms CB1234 and CB26, respectively. The pressure sensor 74 is associated with the torque-transmitting mechanism CB1234. The pressure sensor 76 is associated with the output of the motor and master cylinder 54. The pressure sensor 78 is associated with the torque-transmitting mechanism CB26.

The valves 64 and 66 are associated with the motor and master cylinder 56. The pressure sensor 82 is associated with the motor and master cylinder 56. The pressure sensor 80 is associated with the torque-transmitting mechanism C35R. The valves 68, 70, and 72 are all associated with the motor and master cylinder 58 as is the pressure sensor 84. The pressure sensor 86 is associated with torque transmitting mechanism C456. The pressure sensor 88 is associated with the torque-transmitting mechanism CB1R.

Each of the pressure sensors has an electrical connection with the electro-hydraulic control 24, as does each of the valve members 60, 62, 64, 66, 68, 70, and 72. The electro-hydraulic control 24 can therefore open and close a respective valve member. Each of the motor and master cylinders 54, 56, and 58 are also connected electronically within the electro-hydraulic control 24 so as to provide pressure when desired and to release pressure when desired.

A review of the above-mentioned U.S. Ser. No. 10/975,890 will show that each of the valves 60, 62, 64, 66, 68, 70, and 72 have a control section which establishes the opening of the valve for the passage of fluid. Discontinuance of the control signal permits the valve to close, thereby trapping oil pressure downstream of the valve member, i.e., between the valve member and the respective torque-transmitting mechanism, and again establishing control by the respective motor and master cylinders. The valve mechanism through the operation of its control function can be utilized or employed to reduce the pressure within a respective torque-transmitting mechanism.

The pressure sensors are available to both establish the pressure output of the respective motor and master cylinder apparatus as well as the pressure provided at each of the torque-transmitting mechanisms. This information is useful during transmission operation to maintain information for the electro-hydraulic control 24 so that the control 24 knows which of the torque-transmitting mechanisms is engaged and which is disengaged and what interchange must be made for the up-coming ratio interchange.

To establish the first forward speed ratio, the torque-transmitting mechanisms CB1234 and CB1R must be engaged. This requires the use of motor and master cylinders 54 and 58. During a ratio interchange from first to second, the motor and master cylinder 58 will provide for a reduction of pressure in the torque-transmitting mechanism CB1R while the motor and master cylinder 56 provides pressure for the engagement of the torque-transmitting mechanism CB26. It will be noted that in the first four forward speed ratios, the torque-transmitting mechanism CB1234 remains engaged and therefore the motor and master cylinder 54 can be utilized for other purposes.

During the ratio change from second to third ratio, the motor and master cylinder 56 controls the engagement of the torque-transmitting mechanism C35R while the motor and master cylinder 58 controls the disengagement of the torque-transmitting mechanism CB26 through the valve 70. During the ratio interchange from third to fourth ratio, the motor and master cylinder 58 will control the engagement of the torque-transmitting mechanism C456 through the valve 68 while the motor and master cylinder 56 controls the disengagement of the torque-transmitting mechanism C35R through the valve 64.

In the forward ratios fourth, fifth, and sixth, the torque-transmitting mechanism C456 will be maintained in engagement by the valve 68. To provide a ratio change from fourth to fifth ratios, the motor and master cylinder 54 will control the disengagement of the torque-transmitting mechanism CB1234 through the valve 60 while the motor and master cylinder 56 controls the engagement of the torque-transmitting mechanism C35R through the valve 64. The fifth to sixth ratio interchange is controlled by the motor and master cylinder 54 controlling the engagement of the torque-transmitting mechanism CB26 while the motor and master cylinder 56 controls the disengagement of the torque-transmitting mechanism C35R.

The control apparatus 52, shown in FIG. 3, permits rapid interchanges of an upshift and a downshift; for example, the fourth to fifth and back to fourth interchange is accomplished using three motors and master cylinders. As explained above, the motor and master cylinder 54 will control the engagement and disengagement of the torque-transmitting mechanism CB1234, the motor and master cylinder 58 will control the engagement of the torque-transmitting mechanism C456, and the motor and master cylinder 56 will control the engagement of the torque-transmitting mechanism C35R. On each of the previously described shifts, one clutch is maintained on during the shift. There may be a desire to change the capacity of that clutch during the shift. Capacities of the rotating clutches C35R and C456 may be maintained at as low value as practical to minimize the torque losses in the needle thrust bearing equivalent to 44 and 50 of FIG. 4. A capacity increase may be needed during a shift due to either a change in throttle by the driver or by a change in clutch capacity needed due to the change in gear ratio. In these cases the third motor and master cylinder, that is not being used to apply or release a clutch, can be used to adjust the clutch capacity during the shift. Motor and master cylinder 54 will provide this control of CB1234 during the 1–2, 2–3 and 3–4 shifts. Motor and master cylinder 58 will provide this control of C456 during the 4–5 and 5–6 shifts. By multiplexing the motor and master cylinders 54, 56, and 58, the selection of ratios and controlled interchange therebetween is accomplished.

Figure 4:
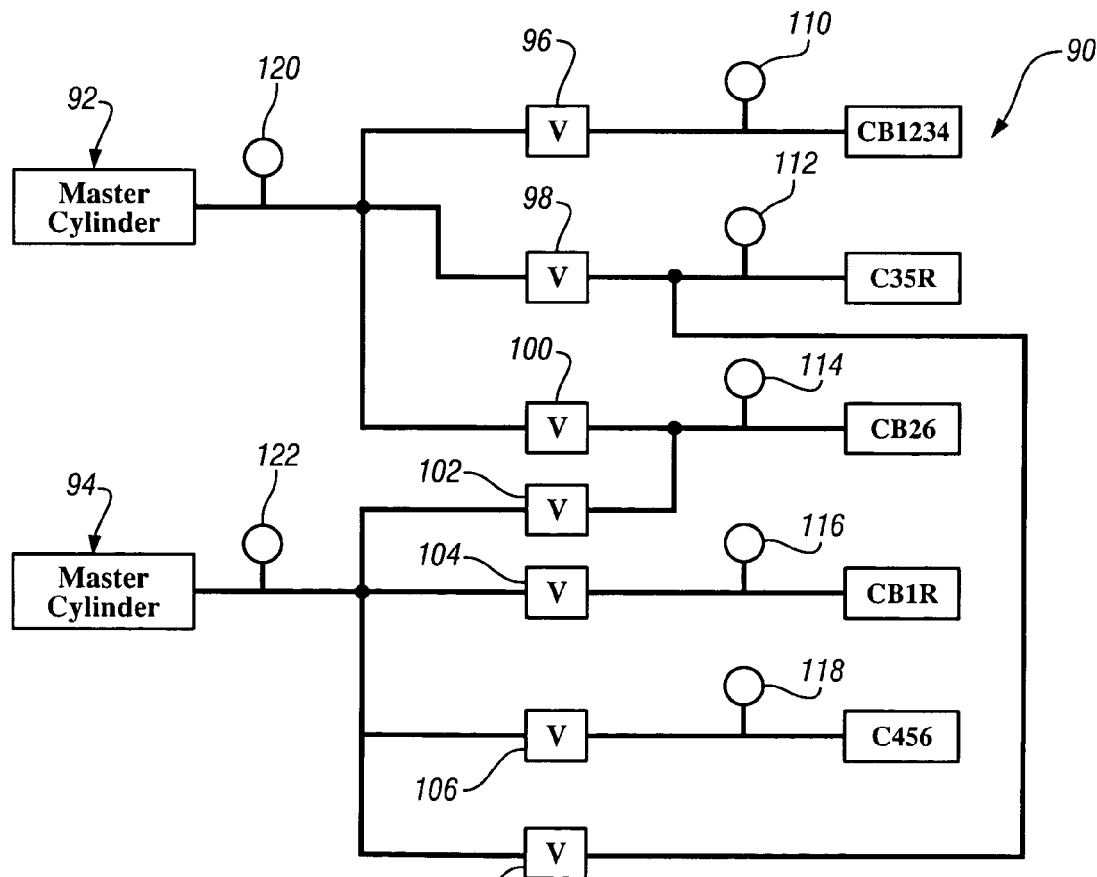
FIG. 4 is an alternative embodiment of the control system incorporating the present invention.

FIG. 4 shows a control mechanism 90, which is an alternative embodiment to the control apparatus 52. The control mechanism 90 employs two master cylinders 92 and 94, seven control valves 96, 98, 100, 102, 104, 106, and 108 as well as pressure sensors 110, 112, 114, 116, and 118 for the torque-transmitting mechanisms CB1234, C35R, CB26, CB1R, and C456, respectively. The pressure output of the master cylinder 92 is sensed by a pressure sensor 120 and a pressure sensor 122 senses the output pressure of the master cylinder 94. The control mechanism 90 is, of course, less expensive than the control mechanism 52 because of the reduced number of master cylinders as well as the use of less pressure sensors.

As can be seen in FIG. 4, the master cylinder 92 can control the engagement and disengagement pressure for the torque-transmitting mechanisms CB1234, C35R, and CB26. The master cylinder 94 can control the engagement and disengagement pressure for the torque-transmitting mechanisms C35R, CB26, CB1R, and C456. The control mechanism 90 shown in FIG. 4 is slightly more cumbersome during a rapid ratio interchange, such as a four-five upshift.

The master cylinder 94 is employed to engage the torque-transmitting mechanism C456 during a ratio change to fourth from third. Immediately prior to a ratio change to fifth, the master cylinder 94 must again respond to boost the pressure in the holding torque-transmitting mechanism C456 then be connected to C35R to control the rise in pressure in the torque-transmitting mechanism. The master cylinder 92 must control the pressure decrease of torque transmitting mechanism CB1234. Thus, a rapid four-five ratio interchange is difficult as are most of the rapid interchanges involving altering holding clutch capacity prior to or just after the interchange takes place. This causes a potential increase in shift delay. However, the control mechanism 90 does perform quite well during the environments it is intended to be employed.

The invention claimed is:

1. An electro-hydraulic control apparatus for a power transmission incorporating at least five torque-transmitting mechanisms, said control apparatus comprising:
   only two master cylinders operable to supply hydrostatic pressure;
   only three control valve mechanisms disposed for fluid connection between one of said master cylinders and at least three of said torque-transmitting mechanisms;
   only four control valve mechanisms disposed for fluid connection between said other master cylinder and only four of said torque-transmitting mechanisms, two of which are also connectible with said one master cylinder; and
   said master cylinders and said control valves being operable to establish five forward speeds and a reverse speed in the transmission through operation of the torque transmitting mechanisms.

2. An electro-hydraulic control valve mechanism for controlling the engagement and disengagement of a plurality of torque-transmitting mechanisms in a power transmission comprising:
   three master cylinders;
   said first master cylinder controlling the distribution of hydrostatic hydraulic fluid through only first and second control valves to only a first and second of said torque-transmitting mechanisms;
   said second master cylinder providing hydrostatic hydraulic control fluid through control valve means to only two of said torque-transmitting mechanisms, one of which is also controlled by said first master cylinder;
   said third master cylinder being controllable to establish engagement and disengagement pressures for only three of said torque-transmitting mechanisms, one of which is also controlled selectively by both said first and second master cylinders; and
   a plurality of control valve means disposed between said master cylinders and said torque transmitting mechanisms for multiplexing the operation of the master cylinders to establish five forward speeds and one reverse speed in the transmission.

* * * * *